UNITED STATES PATENT OFFICE.

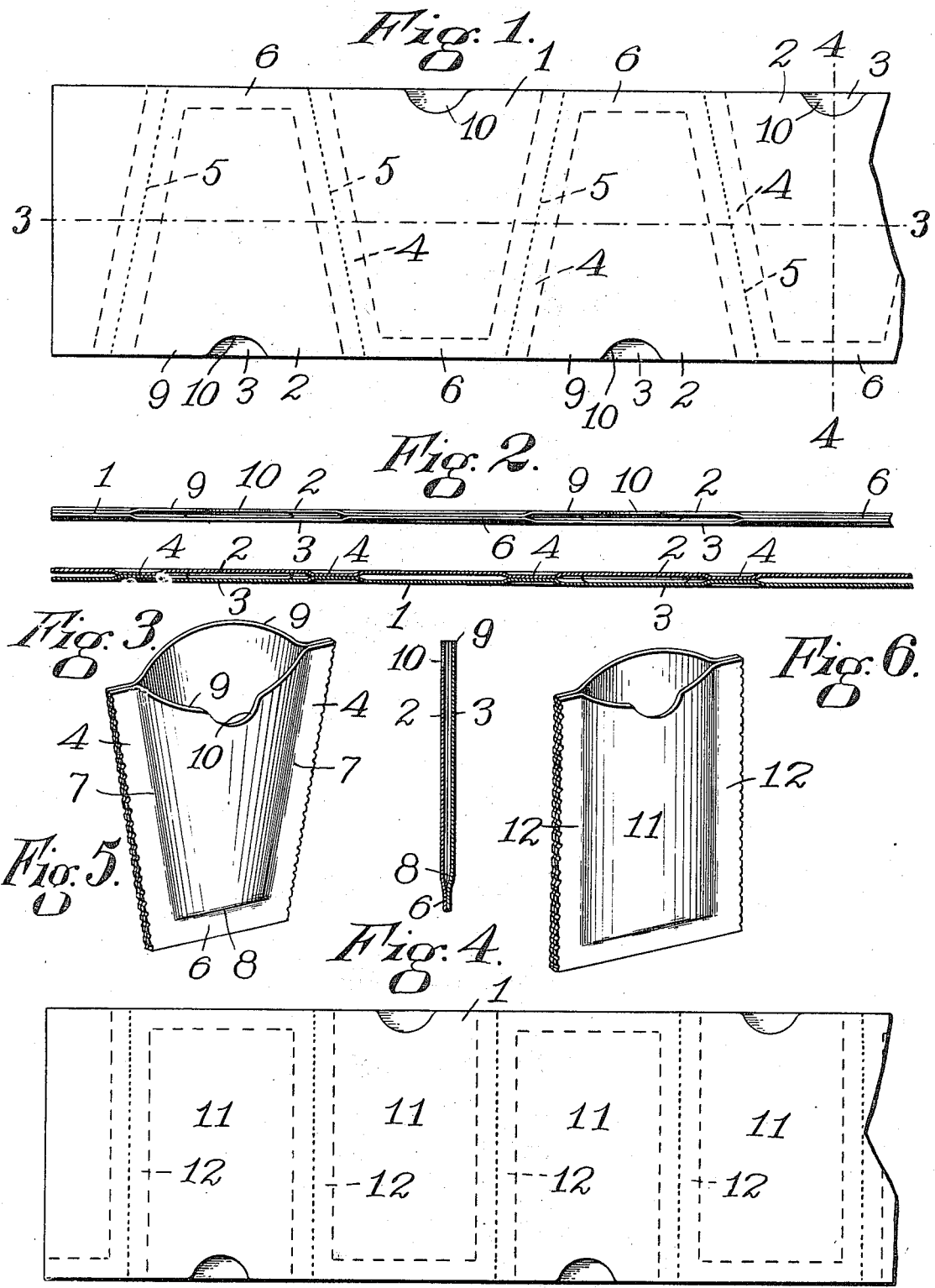

WILLARD E. SWIFT, OF WORCESTER, MASSACHUSETTS, ASSIGNOR TO UNITED STATES ENVELOPE COMPANY, OF SPRINGFIELD, MASSACHUSETTS, A CORPORATION OF MAINE.

DRINKING-CUP.

1,145,093.     Specification of Letters Patent.     Patented July 6, 1915.

Application filed January 20, 1912. Serial No. 672,485.

*To all whom it may concern:*

Be it known that I, WILLARD E. SWIFT, a citizen of the United States, residing at Worcester, in the county of Worcester and Commonwealth of Massachusetts, have invented a new and useful Improvement in Drinking-Cups, of which the following is a specification accompanied by drawings, forming a part of the same.

My invention relates to improvements in drinking cups and consists in producing a series of collapsible cups in the form of a continuous strip from which the individual cups may be readily detached. My construction enables the strips containing the individual cups to be compactly wound in the form of a roll, so that a considerable number of cups may be compressed in a small space for convenience in carrying them in the pocket or in traveling. The rolls may also be placed in suitable fixtures so arranged that the cups may be detached when desired. By my improvements the manufacture is greatly facilitated and the cost of production is largely decreased.

In the drawings, Figure 1 represents a top view of a part of a series of individual drinking cups, showing my improvement in its preferred form. Fig. 2 is an edge view of Fig. 1. Fig. 3 is a sectional view of Fig. 1 on the broken line 3—3. Fig. 4 is a sectional view of Fig. 1 on the broken line 4—4. Fig. 5 is a perspective view of one of the individual cups shown in series in Fig. 1, detached therefrom and opened ready for use. Fig. 6 is a perspective view of one of the individual cups shown in series in Fig. 7, detached therefrom and opened ready for use. Fig. 7 is a top view of a modified form of my invention.

Similar reference characters refer to similar parts in the different figures.

Referring to the drawings, 1 denotes a connected series of individual drinking cups formed from two continuous strips 2 and 3 of flexible material such, for example, as paper of suitable texture. The upper strip 2 is placed upon the lower strip 3 and attached thereto at intervals on transverse sections 4, preferably at oblique angles to the edges of the strips, by placing adhesive material between the strips and applying sufficient pressure to cause them to firmly adhere. Weakened lines 5, conveniently formed by a series of perforations, extend transversely across the strips at or near the centers of the united sections 4. The edges of the strips 2 and 3 are also united by adhesive material between the ends of said transversely united sections 4 which are the nearest together, as indicated at 6, Fig. 1.

When the cups are detached on the weakened lines 5, the transversely united sections 4 form the sides 7, 7 and the united edges 6 the bottom 8 of the cup, as shown in Fig. 5. To enable the top edges 9 of the individual cups to be easily separated preparatory to use, thumb notches 10 are made in the edges of one of the strips centrally between the ends of the transversely united sections 4 which are farthest apart.

The advantage of making the several cups of gradually increasing width from bottom to top, as shown in Fig. 1, resides in the fact that a vessel made in this shape is much more readily spread open, in actual use, than one of uniform width throughout. It will be apparent, also, that in a continuous strip comprising cups of such shape, only the upper ends of alternate cups will be brought at the same edge of the united strips, in order to eliminate waste of material between the cups. While cups of the above described shape constitute the preferred form of my invention, I do not wish to be limited to such shape of cup, and have therefore illustrated another form of cup.

Fig. 7 shows a modified form in which the cups 11 are of uniform width throughout, by making the transversely united sections 12 parallel and at right angles to the edges of the strips, the completed cup being shown in perspective view in Fig. 6. In this form of the invention, the edges of strips are united between the transversely united sections 12 on opposite sides, whereby the open end of one cup is brought at one edge of the united strips and the open end of the adjacent cup is brought at the opposite edge of said united strips, in the same manner as in the first described form of cup. The advantage of this expedient, in the present instance, and also with respect to cups of the form shown in Figs. 1 and 5, resides in a number of considerations incidental to the manufacture of a continuous strip of cups, and also in the greater ease in which a strip made in this manner may be rolled. In the first place, it will be apparent that the elongation of the portions to which moist adhesive is applied, due to the softening of the fibrous material of the strips, will be equalized between the two longitudinal edges of the united strips when such adhesive is applied in equal proportions to the two longitudinal edges. In the second place, a strip united along its longitudinal edges in the manner described can be more readily rolled than one which is united along one longitudinal edge only, first, because the stiffening material, caused by a hardening of the adhesive, is disposed in equal proportions along the two longitudinal edges, and second, because such glued portions, which are thicker than the unglued portions of the united strip, are symmetrically arranged, whereby a roll of uniform thickness, with the edges of the united strip corresponding to the ends of the roll, of equal thickness throughout, is formed.

Cups formed in a connected series of individual cups, detachably connected at their side edges, can be rapidly manufactured by feeding two strips of material together, one of said strips having been previously prepared with gummed surfaces where the strips are to be united. The connected series may be tightly wound forming a compact roll convenient for transportation, and in a form which will preserve the individual cups from injury, allowing the cups to be individually and successively detached from the roll as they are required for use.

I claim,

1. As an article of manufacture, a series of drinking cups, comprising two continuous strips of flexible material placed in contact one upon the other, said strips being attached to each other transversely at intervals with the edges of said strips united between said transversely attached portions alternately on opposite sides, whereby the open end of one cup is brought at one edge of said united strips and the open end of the adjacent cup is brought at the opposite edge of said united strips.

2. As an article of manufacture, a series of drinking cups in a continuous strip, comprising two separate continuous strips of flexible material placed in contact one upon the other and attached at intervals transversely at oblique angles to their longitudinal edges, and attached at their edges alternately on opposite sides between the ends of said transversely united sections which are nearest together.

Dated this 18th day of January 1912.

WILLARD E. SWIFT.

Witnesses:
PENELOPE COMBERBACH,
NELLIE WHALEN.